United States Patent [19]

Hutchins et al.

[11] Patent Number: 5,139,087
[45] Date of Patent: Aug. 18, 1992

[54] METHOD FOR ENSURING INJECTIVITY OF POLYMER SOLUTIONS

[75] Inventors: Richard D. Hutchins, Placentia; Hoai T. Dovan, Yorba Linda, both of Calif.

[73] Assignee: Union Oil Company of California, Los Angeles, Calif.

[21] Appl. No.: 708,164

[22] Filed: May 31, 1991

[51] Int. Cl.$^5$ .................. E21B 43/22; E21B 47/00
[52] U.S. Cl. ................... 166/249; 166/75.1; 166/275; 252/8.554; 366/177
[58] Field of Search ........... 166/250, 252, 249, 275, 166/305.1, 75.1, 177; 252/8.554; 366/108, 116, 127; 523/300, 303

[56] References Cited

U.S. PATENT DOCUMENTS

| | | | |
|---|---|---|---|
| 3,527,300 | 9/1970 | Phillips | 166/249 |
| 3,578,081 | 5/1971 | Bodine | 166/249 |
| 3,754,598 | 8/1973 | Holloway, Jr. | 166/249 |
| 4,071,225 | 1/1978 | Holl | 366/127 X |
| 4,204,574 | 5/1980 | Stalder | 166/252 X |
| 4,544,032 | 10/1985 | Echols | 166/75.1 X |
| 4,580,627 | 4/1986 | Argabright et al. | 166/75.1 X |
| 4,605,689 | 8/1986 | Witheford et al. | 166/75.1 X |
| 4,640,360 | 2/1987 | Bodine et al. | 166/286 |
| 4,675,348 | 6/1987 | Martischius et al. | 523/323 |
| 4,679,628 | 7/1987 | Luetzelschwab | 166/252 |
| 4,945,937 | 8/1990 | Scribner | 366/108 X |
| 5,052,486 | 10/1991 | Wilson | 166/177 X |

FOREIGN PATENT DOCUMENTS 2001999 2/1979 United Kingdom.

OTHER PUBLICATIONS

Alliger, *American Laboratory*, "Ultrasonic disruption", (Oct. 1975).
Alliger, *American Laboratory*, "New Methods in ultrasonic Processing", (Sep. 1980).
Berliner, III, *American Biotechnology Laboratory*, "Application of ultrasonic Processors", (Mar. 1984).
Brandon *Ultrasonics*, "The Sonifier II For Ultrasonic Cell Disruption", (1986).
Heat Systems Ultrasonics, "Liquid Processing Cell Disruption Homogenization Emulsification", pp. 1-12, (1984).
*Heat Systems Ultrasonics, Inc.,* "Sonicator Cell Disruptor Service Bulletin", pp. 1-4, (1982).
*Heat Systems Ultrasonics, Inc.,* "Sonicator Series Bibliography", Ultrasound and Disinfection, (1982).
*Heat Systems Ultrasonics, Inc.,* "Sonicator Series Bibliography", Ultrasonic Emulsification in Biological Materials, (1985).
*Heat Systems Ultrasonics, Inc.,* "Sonicator Series Bibliography", Action of Ultrasonics on Polymers General Research, (1984).
*Heat Systems Ultrasonics, Inc.,* "Sonicator Series Bibliography", Sonochemistry Ultrasonic Cavitation and Chemical Reactions, (1984).
*Heat Systems Ultrasonics, Inc.,* "Sonicator Series Bibliography", Application of Ultrasonics in Geology and Earth Sciences, (1982).
*Heat Systems Ultrasonics, Inc.,* "Sonicator Series Bibliography", Ultrasonics and Liposomes, pp. 1-6, (1981).
Southwick, *SPE Reservoir Engineering*, "Molecular Degradation, Injectivity, and Elastic Properties of Polymer Solutions", pp. 1193-1201, (Nov. 1988).
Freundlich et al., "The Influence of Ultrasonic Waves on Gels", Trans. Faraday Society, pp. 966-970, (Apr. 23, 1936).
Odell et al., *American Chemical Society*, "Degradation of Polymer Solutions in Extensional Flows", vol. 23, No. 12, (1990) pp. 3092-3103.
Merrill et al., *Polymer Communications*, "Scission of Macromolecules in Dilute Solution: Extensional and Turbulent Flows", vol. 25, (May, 1984) pp. 144-146.

(List continued on next page.)

*Primary Examiner*—George A. Suchfield
*Attorney, Agent, or Firm*—Gregory F. Wirzbicki; Shlomo R. Frieman

[57] ABSTRACT

Without interrupting an enhanced oil recovery polymer flood of a subterranean formation, ultrasonic energy is used to maintain the injectivity of a polymer solution during the polymer flood by modifying the properties of the injected polymer solution.

20 Claims, 2 Drawing Sheets

OTHER PUBLICATIONS

Mostafa, *Journal of Polymer Science*, vol. 33, pp. 323-335, (1958).

Buell et al., *SPE 16963*, pp. 301-316, (1987).

Jellinek et al., *Journal of Polymer Science*, vol. 7, No. 1, pp. 21-32, (Aug. 25, 1950).

Mostafa, *Journal of Polymer Science*, vol. 33, pp. 295-310 (1958).

Mostafa, *Journal of Polymer Science*, vol. 33, pp. 311-321 (1958).

Brett et al., *Journal of Polymer Science*, vol. 13, pp. 441-459 (1954).

Melville et al., *Chemistry Dept., Univ. of Birmingham*, "The Ultrasonic Degradation of Polymers", pp. 996-1009, (Apr. 11, 1950).

Ovenall et al., *Journal of Polymer Science, vol. 33, pp. 207-212 (1958).*

Allen et al., *Journal of Polymer Science*, vol. 33, pp. 213-225 (1958).

van Poollen et al., Fundamentals of Enhanced Oil Recovery, PennWell Publishing Company, pp. 83-103, (1980).

Dovan et al., *SPE 20060*, pp. 391-400, (1990).

Gooberman, *Journal of Polymer Science*, vol. 42, pp. 25-33, (1960).

Gooberman, *Journal of Polymer Science*, vol. 42, pp. 35-48, (1960).

Ayer et al., "Implementing An Offshore Polymer Flood", American Petroleum Institute, Joint Chapter Meeting, Ventura, CA, (Nov. 7, 1985).

Langhorst et al. *American Chemical Society*, 58, pp. 2242-2247, (1986).

Jennings et al., *Journal of Petroleum Technology*, pp. 391-401, (Mar. 1971).

METHOD FOR ENSURING INJECTIVITY OF POLYMER SOLUTIONS

BACKGROUND

The present invention relates to treating aqueous polymer solutions used in polymer floods of subterranean formations to enhance the recovery of oil.

The fundamentals of enhanced oil recovery polymer flooding of subterranean formations are well known to those skilled in the art. See, for example, H.K. van Poollen and Associates, Inc., *Fundamentals of Enhanced Oil Recovery*, PennWell Publishing Co., Tulsa, OK (1980), chapter 5 (van Poollen). Generally, in a polymer flood, a polymer is added to water to form a viscous polymer solution. When the polymer solution is injected into an oil reservoir, the oil is more efficiently recovered from the formation. The polymer solutions must be matched with characteristics (e.g., pore size distribution, permeability, and salinity) of the subterranean formation to achieve optimum results and to prevent formation damage.

Shearing the polymer solution is one method for optimizing polymer solution properties. The advantages of selectively shearing solutions of partially hydrolyzed polyacrylamide are noted in published British patent application 2,001,999 (Grodde). Grodde employs perforated plates to achieve his desired degree of shearing. Another polymer flood system employing plates to shear the polymer is discussed and illustrated in Dovan et al., SPE 20060 (1990) (Dovan), this paper being incorporated herein in its entirety by reference.

SUMMARY

The present invention provides a more efficient technique for shearing a polymer solution employed in polymer flooding. In particular, significant drawbacks are involved in employing perforated plates to shear polymer solutions injected during a polymer flood. For example, if the desired degree of shear is not achieved by the installed shear plates, the polymer flood must be stopped while the plates are changed and/or modified. To further complicate matters, locating and determining the optimum position, size, and number of perforations per plate and/or the optimum number of plates is not an exact science, but is largely empirical.

In accordance with this invention, the desired degree of shear is achieved "on the fly"—i.e., continuously, without interrupting the polymer flood, while the aqueous polymer solution is being piped from the polymer preparation area to the location where the polymer solution is injected into a subterranean formation. Specifically, the desired degree of shear is obtained by subjecting the polymer-containing aqueous solution to ultrasonic waves, while in transit.

The present invention also encompasses a polymer enhanced oil recovery system comprising (a) a conduit for transporting a polymer-containing solution to a wellbore, the wellbore penetrating at least a portion of a subterranean formation; (b) a pump in fluid communication with the conduit for injecting the polymer-containing solution through at least a portion of the wellbore and into at least a portion of a subterranean formation; and (c) a device located downstream from the pump and upstream from the wellbore and in fluid communication with at least a portion of the polymer-containing solution for ultrasonically shearing the polymer in the solution.

DRAWINGS

The ease and efficiency in which polymer solutions employed in polymer floods are selectively, ultrasonically sheared and other features, aspects, and advantages of the present invention will be better understood with reference to the following description, appended claims, and accompanying drawings where:

DETAILED DESCRIPTION OF THE INVENTION

Figure 1:
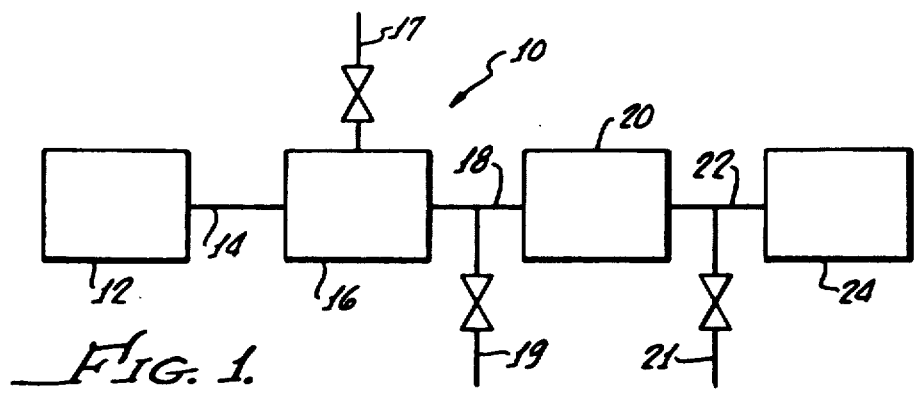
FIG. 1 is a schematic representation of a polymer flood process.

The present invention provides a polymer flood process employing ultrasonic energy to shear the polymer used in the process. As shown in FIG. 1, the polymer flood process 10 of the present invention generally entails storing a polymer in storage zone 12 and transporting the polymer through a conduit 14 to a mixing zone 16 where the polymer is intimately mixed with water introduced through a conduit 17. Upon leaving the mixing zone 16, the polymer is carried by a conduit 18 to a shearing zone 20 where the polymer is ultrasonically sheared. The effluent from the shearing zone 20 moves via a conduit 22 to an injection zone 24 where the sheared polymer is injected into at least a portion of a subterranean formation (not shown) through one or more wellbores.

Exemplary preferred polymers used in polymer floods are polysaccharides (e.g., xanthan), polyacrylamides, partially hydrolyzed polyacrylamides, and copolymers of acrylamide and (a) acrylic acid, (b) vinyl pyrrolidone, (c) sodium 2-acrylamido-2-methylpropane sulfonate (sodium AMPS), and (d) mixtures of (a), (b), and (c). The desired viscosity average molecular weight of these polymers for polymer floods is formation specific and, therefore, must be determined on a case by case basis. In very rough terms, the target viscosity average molecular weights of the (a) polysaccharides and (b) polyacrylamides, partially hydrolyzed polyacrylamides, and acrylamide copolymers employed in polymer floods range between (a) about 1,000,000 to about 5,000,000 and (b) about 1,000,000 to about 20,000,000, respectively.

Figure 2:
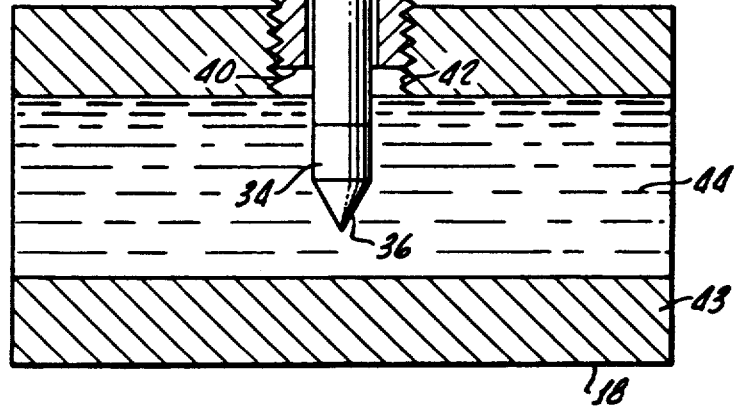
FIG. 2 is an elevational view partially in cross section of one device employed in the process for ultrasonically treating a polymer solution used in the polymer flood.

In one version of the invention, the polymer is sheared in the shearing zone 20 using an ultrasonic processor 30 mounted in the conduit 18 as shown in FIG. 2. The ultrasonic processor 30 comprises a convertor 32, a horn 34, and an optional microtip probe 36. The ultrasonic processor 30 generally is capable of generating ultrasonic waves from about 1,000 to about 100,000 Hertz, preferably from about 10,000 to about 100,000 Hertz, and more preferably from about 20,000 to about 80,000 Hertz. Typically, the output intensity of the ultrasonic processor 30 is about 200 to about 2,000 watts per square centimeter (W/cm$^2$), while the amplitude of the ultrasonic processor ranges from about 25 microns to about 250 microns.

The ultrasonic processor 30 is inserted into the conduit 18 through a sleeve 38 having one end 40 threaded into an opening 42 in the wall 43 of the conduit 18. The microtip probe 36 and preferably also the horn 34 are positioned within the conduit 18 and are in physical contact with the polymer-containing solution 44 used in the polymer flood. The ultrasonic processor 30 is securely held in place by an O-ring 46 seated in a recession 48 in the other threaded end 50 of the sleeve 38. To ensure that the O-ring 46 remains immobilized, a cap 52 is tightly screwed onto the threaded end 50 of the sleeve. The ultrasonic processor is connected to an ultrasonic generator (not shown) by an electrical cable 54. Ultrasonic processors 30, ultrasonic generators, and related equipment are readily available from companies such as Heat Systems-Ultrasonics, Inc., Farmingdale, NY and Branson Sonic Power, Danbury, CT.

Figure 3:
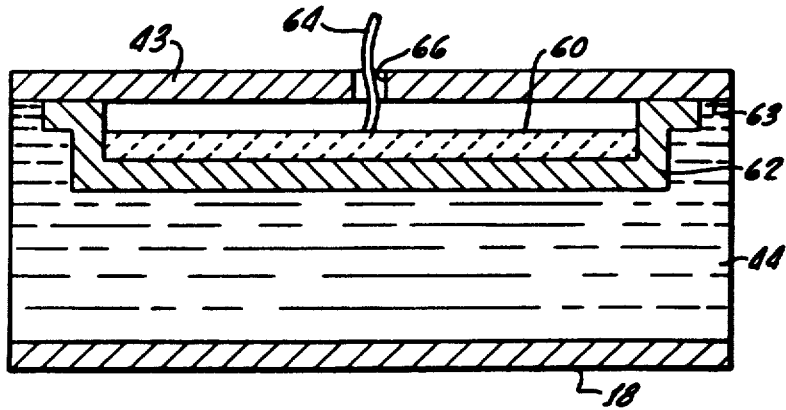
FIG. 3 is an elevational view partially in cross section of another device employed in the process for ultrasonically shearing a polymer solution used in the polymer flood.

In another version of the invention shown in FIG. 3, the polymer-containing solution 44 is subjected to ultrasonic energy generated by a piezoelectric transducer 60 bonded (e.g., with an adhesive) to a housing 62 which is hermetically sealed to the inner surface 63 of the conduit 18. The polymer-containing fluid is preferably in physical contact with at least a portion, and more preferably substantially all, of the housing 62. The housing 62 is preferably made of a titanium alloy the same as or similar to that customarily employed in making the horn 34, and the piezoelectric transducer 60 is preferably made of lead zirconate titanate. An electrical cord 64, which makes electrical contact with the piezoelectric transducer 60 and an ultrasonic generator (not shown), passes through an aperture 66 in the wall 43 of the conduit 18.

In both ultrasonic shearing versions shown in FIGS. 2 and 3, the polymer is sheared by being exposed to ultrasonic energy as the polymer-containing solution 44 passes through the ultrasonic shearing zone 20. In the embodiment shown in FIG. 2, the shearing is effected using the ultrasonic processor 30, whereas in FIG. 3 the ultrasonically vibrating housing 62 shears the polymer.

In practice, the polymer employed is selected to achieve the best results in the polymer flood based upon laboratory analyses (e.g., oil recovery and flow tests measured with various formation core samples, viscosity measurements, screen factor determinations, and filtration tests such as disclosed by Ayer et al., "Implementing as Offshore Polymer Flood," American Petroleum Institute Joint Chapter Meeting, November 7, 1985, Ventura, CA (Ayer), this paper being incorporated herein in its entirety by reference). This polymer is then used in the polymer flood, and the properties of the polymer solution noted. For example, samples of the polymer in the field are taken from a take-off valve 19 (see FIG. 1) upstream of the ultrasonic shearing zone 20 to determine whether the desired viscosity average molecular weight is being achieved in the polymer flood process. If the measured viscosity average molecular weight is higher than that desired, the polymer-containing solution is then subjected to ultrasonic energy in shearing zone 20 to reduce the viscosity average molecular weight. The results of the ultrasonic treatment are assessed, for example, by taking a sample of the ultrasonic treated polymer-containing solution from a take-off valve 21 (see FIG. 1) downstream from the ultrasonic shearing zone 20. If the desired viscosity average molecular weight has been achieved, the degree of ultrasonic shearing is maintained. However, if the desired viscosity average molecular weight has not been achieved or if the resulting viscosity average molecular weight is too low, the ultrasonic treatment is altered by changing the power or intensity and/or amplitude of the ultrasonic waves—without shutting the polymer flood down—by simply adjusting the ultrasonic generator. Either the frequency or amplitude of the ultrasonic wave or both are adjustable for purposes of achieving the desired degree of shear.

Other parameters or characteristics also helpful in evaluating the success of the polymer flood are shear viscosity (see, for example Ayer), screen factor (see, for example Dovan and Jennings et al., *Journal of Petroleum Technology*, pages 391–401 (March, 1971) (Jennings), Jennings being incorporated herein in its entirety by reference), core plug tests (see, for example, Ayer), molecular weight distribution (see, for example, Langhorst et al., *Anal. Chem.*, 58: 2242-2247 (1986) (Langhorst), Langhorst being incorporated herein in its entirety by reference), and Hall plot (see, for example, Dovan). For example, the injection pressure of the ultrasonically treated polymer-containing solution is measured and the ultrasonic waves are adjusted to maintain a substantially constant injection presure while maintaining a substantially constant injection rate. As known to those skilled in the art, an injected solution exhibiting a substantially constant injection pressure when injected at a substantially constant injection rate has a substantially linear Hall plot.

EXAMPLES

The following examples—which are for purposes of illustrating and not limiting the invention— demonstrate ultrasonically degrading an acrylic acid-acrylamide copolymer.

EXAMPLES 1–4

A potassium chloride (KCl) solution (about 1 weight percent) was made by adding about 10 g of KCl to about 990 g of deionized water. A stock polymer solution containing about 1000 ppm of an acrylic acid-acrylamide copolymer was prepared by adding about 0.85 g of Nalflo 3857 brand acrylic acid-acrylamide copolymer (available from Nalco Chemical Co., Sugarland, Texas) to about 299.2 g of the KCl solution. The acrylic acid-acrylamide copolymer was quickly injected via a syringe into the vortex formed by stirring the KCl solution at about 600 rpm with an overhead mixer. Stirring continued for about 45 minutes.

Aliquots of the stock polymer solution (about 50 ml each) were transferred to four glass beakers. Each beaker was immersed in an ultrasonic bath (model T-14B made by L&R Manufacturing Co., Kearny, NJ) operating at 43,000 Hertz and 270 watts (peak) for a different period of time as shown below in Table I. The ultrasonically treated polymer solutions were cooled to room temperature and their viscosities and screen factors determined. Viscosities were measured using a Brookfield LVT rotational viscometer fitted with the UL adaptor using a rotational speed of about 6 rpm. Screen factors were measured using the screen viscometer apparatus described in Jennings and commercially available from Allen Co., Boulder, Colorado.

TABLE I

| Example | Minutes left in Ultrasonic Bath | Solution Viscosity, centipoise | Screen Factor |
|---|---|---|---|
| 1 | 0 | 16.7 | 26.1 |
| 2 | 10 | 7.2 | 14.5 |
| 3 | 20 | 6.8 | 13.0 |
| 4 | 60 | 5.2 | 10.7 |

The above examples demonstrate that ultrasonic energy reduces both viscosity and screen factor of the polymer solution, thereby indicating a change in the polymer molecular weight.

Figure 4:
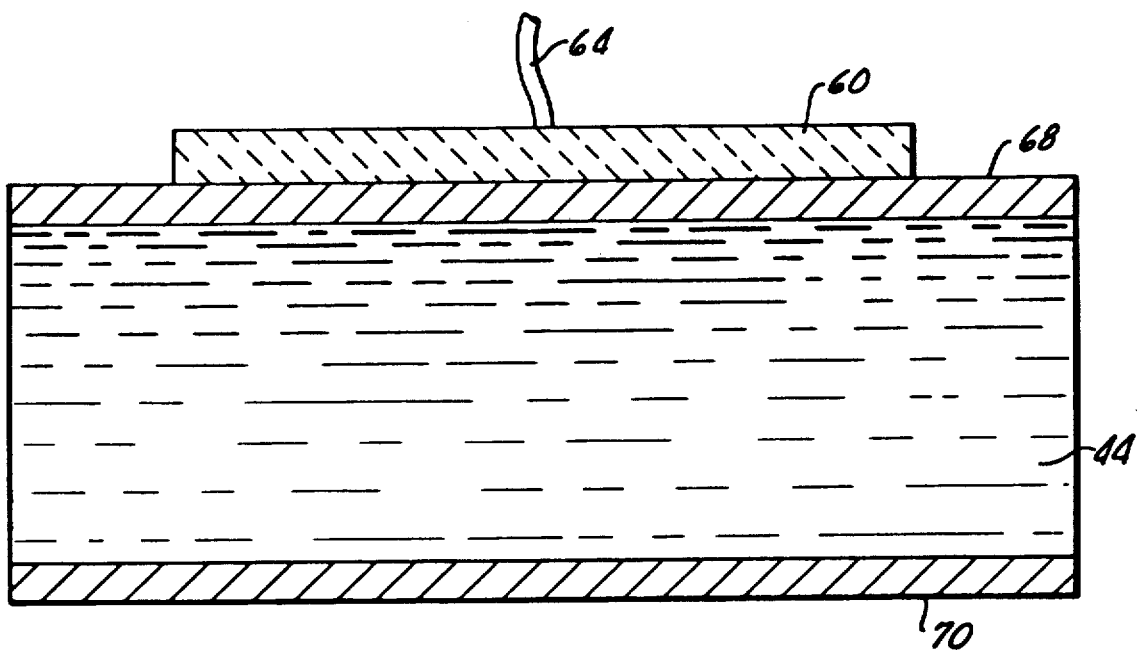
FIG. 4 is an elevational view partially in cross section of yet another device employed in the process for ultrasonically shearing a polymer solution used in the polymer flood.

Although the present invention has been described in considerable detail with reference to certain preferred versions thereof, other versions are possible. For example, several ultrasonic processors can be mounted in the conduit 18. In addition, as shown in FIG. 4, a piezoelectric transducer 60 can be adhesively bonded to the outside surface 68 of a pipe 70, as opposed to being mounted on the inside. When the piezoelectric transducer 60 is bonded to the outside of the pipe 70, the pipe 70 onto which it is mounted is preferably fabricated from a titanium alloy the same as or similar to that customarily employed in making the horn 34. To prevent ultrasonically vibrating the conduit 18 entering the shearing zone 20 or the conduit 22 exiting the shearing zone, the pipe 70 is coupled to the conduit 18 and the conduit 22 using rubber isolation connections (not shown). Furthermore, one or more ultrasonic processors can be mounted coaxially within the conduit 18. Also, the polymer solution employed in some polymer floods is introduced into the subterranean formation using pressurized gas as the driving force and, in other polymer floods, a vacuum within the wellbore draws the polymer solution into the formation. In both of these latter cases, a pump is not necessary to transport or drive the polymer solution into the formation. Therefore, the spirit and scope of the appended claims should not necessarily be limited by the description of the preferred versions contained herein.

What is claimed is:

1. A polymer flood enhanced oil recovery method comprising the steps of:
   (a) subjecting a polymer-containing solution to ultrasonic waves to shear the polymer; and
   (b) injecting the ultrasonically treated polymer-containing solution of step (a) into at least a portion of a subterranean formation.

2. The method of claim 1 wherein the polymer-containing solution is subjected to ultrasonic waves to modify the viscosity average molecular weight of the polymer in the polymer-containing solution.

3. The method of claim 1 wherein a Hall plot for the injected solution is substantially linear.

4. The method of claim 1 wherein the ultrasonically treated polymer-containing solution of step (a) is injected into subterranean formation without plugging the formation.

5. The method of claim 1 wherein the polymer is treated with ultrasonic waves of about 10,000 to about 100,000 Hertz.

6. The method of claim 1 wherein the polymer is treated with ultrasonic waves of about 20,000 to about 80,000 Hertz.

7. The method of claim 1 wherein the polymer is selected from the group consisting of polysaccharides, polyacrylamides, partially hydrolyzed polyacrylamides, copolymers of acrylic acid and acrylamide, copolymers of vinyl pyrrolidone and acrylamide, and copolymers of sodium 2-acrylamido-2-methylpropane sulfonate (sodium AMPS) and acrylamide.

8. The method of claim 1 further comprising the steps of sampling the ultrasonically treated polymer-containing solution, analyzing a property of the ultrasonically treated polymer-containing solution, and adjusting the frequency of the ultrasonic waves to modify the analyzed property of the ultrasonically treated polymer-containing solution.

9. The method of claim 1 further comprising the steps of sampling the ultrasonically treated polymer-containing solution, analyzing a characteristic of the ultrasonically treated polymer-containing solution, and adjusting the amplitude of the ultrasonic waves to modify the analyzed characteristic of the ultrasonically treated polymer-containing solution.

10. The method of claim 1 further comprising the steps of sampling the ultrasonically treated polymer-containing solution, analyzing a characteristic of the ultrasonic treated polymer-containing solution, and adjusting the power of the ultrasonic waves to modify the analyzed characteristic of the ultrasonically treated polymer-containing solution.

11. The method of claim 1 further comprising the steps of sampling the polymer-containing solution, analyzing a characteristic of the polymer-containing solution, and adjusting the ultrasonic waves to modify the analyzed characteristic of the polymer-containing solution.

12. The method of claim 1 further comprising the step of measuring the injection pressure of the ultrasonically treated polymer-containing solution and adjusting the ultrasonic waves to maintain a substantially constant injection pressure while maintaining a substantially constant injection rate.

13. A polymer flood enhanced oil recovery system comprising:
   (a) means for transporting a polymer-containing solution to a wellbore, the wellbore penetrating at least a portion of a subterranean formation; and
   (b) means in fluid communication with at least a portion of the polymer-containing solution for subjecting the polymer-containing solution to ultrasonic waves to shear the polymer,
wherein the ultrasonic means is upstream from the wellbore.

14. The system of claim 13 further comprising means in fluid communication with the transport means for injecting the polymer-containing solution through at least a portion of the wellbore and into at least a portion of a subterranean formation, wherein the ultrasonic means is located downstream from the injection means and upstream from the wellbore.

15. The system of claim 13 further comprising means for sampling the ultrasonically treated polymer-containing solution, the sampling means being located along the transport means downstream from the ultrasonic means.

16. The system of claim 13 further comprising means for sampling the polymer-containing solution, the sampling means being located along the transport means upstream from the ultrasonic means.

17. The system of claim 13 further comprising means for sampling the polymer-containing solution and means for sampling the ultrasonically treated polymer-containing solution, the polymer-containing solution sampling means being located along the transport means upstream from the ultrasonic means and the ultrasonically treated sampling means being located along the transport means downstream from the ultrasonic means.

18. The system of claim 13 wherein the ultrasonic means comprises an ultrasonic horn, the transport means comprises a conduit, and the ultrasonic horn protrudes into the interior of the conduit through an opening in the wall of the conduit.

19. The system of claim 13 wherein the ultrasonic means comprises a piezoelectric transducer, the transport means comprises a conduit, and the piezoelectric transducer is mounted on the interior surface of the conduit.

20. The system of claim 13 wherein the ultrasonic means comprises a conduit having an ultrasonic piezoelectric transducer coupled to at least a portion of the outer surface of the conduit, wherein one end of the conduit is coupled to the upstream portion of the transport means and another end of the conduit is coupled to the downstream portion of the transport means and the piezoelectric transducer, when energized, causes the conduit to ultrasonically vibrate.

* * * * *